US012682595B2

(12) United States Patent
Francis et al.

(10) Patent No.: US 12,682,595 B2
(45) Date of Patent: Jul. 14, 2026

(54) SYSTEM AND METHOD FOR TRANSFER SEMANTIC SEGMENTATION VIA LEARNABLE IMAGE PROMPTING OF FOUNDATION MODELS

(71) Applicant: Robert Bosch GmbH, Stuttgart (DE)

(72) Inventors: Jonathan Francis, Pittsburgh, PA (US); Rajshekhar Das, Pittsburgh, PA (US); Sanket Vaibhav Mehta, Pittsburgh, PA (US); Tanmay Kulkarni, Pittsburgh, PA (US)

(73) Assignee: Robert Bosch GmbH (DE)

( * ) Notice: Subject to any disclaimer, the term of this patent is extended or adjusted under 35 U.S.C. 154(b) by 255 days.

(21) Appl. No.: 18/540,267

(22) Filed: Dec. 14, 2023

(65) Prior Publication Data

US 2025/0200928 A1      Jun. 19, 2025

(51) Int. Cl.
*G06V 10/26* (2022.01)
*G06V 10/82* (2022.01)

(52) U.S. Cl.
CPC .............. *G06V 10/26* (2022.01); *G06V 10/82* (2022.01)

(58) Field of Classification Search
CPC ........ G06V 10/26; G06V 10/82; G06V 20/80; G06N 3/0455; G06N 3/08
See application file for complete search history.

(56) References Cited

U.S. PATENT DOCUMENTS

| | | | | |
|---|---|---|---|---|
| 10,430,946 B1 * | 10/2019 | Zhou | .................. | A61B 5/02007 |
| 2021/0343014 A1 * | 11/2021 | Haghighi | ............... | G06V 10/82 |
| 2022/0391636 A1 * | 12/2022 | Lian | .................... | G06F 18/2137 |

(Continued)

FOREIGN PATENT DOCUMENTS

| | | | | | |
|---|---|---|---|---|---|
| CN | 116311254 A | * | 6/2023 | ............. | G06V 20/70 |
| CN | 116311271 A | * | 6/2023 | ........... | G06V 30/153 |

(Continued)

OTHER PUBLICATIONS

Alberti, E., Tavera, A., Masone, C., and Caputo, B. IDDA: A large-scale multi-domain dataset for autonomous driving. IEEE Robotics and Automation Letters, 5(4):5526-5533, Oct. 2020. doi: 10.1109/Ira.2020.3009075. URL https://doi.org/10.1109%2FIra.2020.3009075.

(Continued)

*Primary Examiner* — Stephen R Koziol
*Assistant Examiner* — Benedict E Lee
(74) *Attorney, Agent, or Firm* — Dickinson Wright PLLC

(57) ABSTRACT

A system includes a controller configured to receive one or more fixed text prompts and one or more images, wherein the fixed text prompts are associated with the one or more images. The controller is further configured to, in response to utilizing the fixed text prompt and the one or more images at a foundation model associated with a machine-learning network, output an intermediate representation from generating a series of objects and a task, decode the intermediate representation utilizing a decoder associated with the foundation model to generate a matrix associated with the task associated with the fixed text prompt and the image, and in response to identifying a highest probability associated with the matrix utilizing label selection, output a final label associated with a visual based prediction task.

20 Claims, 11 Drawing Sheets

(56) References Cited

U.S. PATENT DOCUMENTS

| | | | | | |
|---|---|---|---|---|---|
| 2023/0162481 | A1* | 5/2023 | Yuan | | G06T 9/00 |
| | | | | | 382/159 |
| 2023/0325725 | A1* | 10/2023 | Lester | | G06N 3/0455 |
| 2023/0351102 | A1* | 11/2023 | Tran | | G06N 3/0895 |
| 2024/0265718 | A1* | 8/2024 | Zhang | | G06F 18/00 |

FOREIGN PATENT DOCUMENTS

| | | | | | |
|---|---|---|---|---|---|
| CN | 116452472 | A | * | 7/2023 | G06T 5/40 |
| CN | 116933740 | A | * | 10/2023 | G06F 40/166 |
| CN | 117034933 | A | * | 11/2023 | G06F 40/295 |
| CN | 113657253 | B | * | 12/2023 | G06N 3/08 |
| CN | 117636473 | A | * | 3/2024 | G06N 3/08 |

OTHER PUBLICATIONS

Carion, N., Massa, F., Synnaeve, G., Usunier, N., Kirillov, A., and Zagoruyko, S. End-to-end object detection with transformers, 2020. URL https://arxiv.org/abs/2005.12872.

Cordts, M., Omran, M., Ramos, S., Rehfeld, T., Enzweiler, M., Benenson, R., Franke, U., Roth, S., and Schiele, B. The cityscapes dataset for semantic urban scene understanding, 2016. URL https://arxiv.org/abs/1604.01685.

Devlin, J., Chang, M .- W., Lee, K., and Toutanova, K. Bert: Pre-training of deep bidirectional transformers for language understanding, 2018. URL https://arxiv.org/abs/1810.04805.

Dosovitskiy, A., Ros, G., Codevilla, F., Lopez, A., and Koltun, V. Carla: An open urban driving simulator, 2017. URL https://arxiv.org/abs/1711.03938.

Dosovitskiy, A., Beyer, L., Kolesnikov, A., Weissenborn, D., Zhai, X., Unterthiner, T., Dehghani, M., Minderer, M., Heigold, G., Gelly, S., Uszkoreit, J., and Houlsby, N. An image is worth 16x16 words: Transformers for image recognition at scale, 2020. URL https://arxiv.org/abs/2010.11929.

Ge, C., Huang, R., Xie, M., Lai, Z., Song, S., Li, S., and Huang, G. Domain adaptation via prompt learning, 2022. URL https://arxiv.org/abs/2202.06687.

Goodfellow, I. J., Mirza, M., Xiao, D., Courville, A., and Bengio, Y. An empirical investigation of catastrophic forgetting in gradient-based neural networks, 2013. URL https://arxiv.org/abs/1312.6211.

Herman, J., Francis, J., Ganju, S., Chen, B., Koul, A., Gupta, A., Skabelkin, A., Zhukov, I., Kumskoy, M., and Nyberg, E. Learn-to-race: A multimodal control environment for autonomous racing. In Proceedings of the IEEE/CVF International Conference on Computer Vision, pp. 9793-9802, 2021.

Huo, X., Xie, L., Hu, H., Zhou, W., Li, H., and Tian, Q. Domain-agnostic prior for transfer semantic segmentation, 2022. URL https://arxiv.org/abs/2204.02684.

Langley, P. Crafting papers on machine learning. In Langley, P. (ed.), Proceedings of the 17th International Conference on Machine Learning (ICML 2000), pp. 1207-1216, Stanford, CA, 2000. Morgan Kaufmann.

Li, B., Weinberger, K. Q., Belongie, S., Koltun, V., and Ranftl, R. Language-driven semantic segmentation, 2022. URL https://arxiv.org/abs/2201.03546.

Liu, P., Yuan, W., Fu, J., Jiang, Z., Hayashi, H., and Neubig, G. Pre-train, prompt, and predict: A systematic survey of prompting methods in natural language processing. arXiv preprint arXiv:2107.13586, 2021a.

Liu, Z., Lin, Y., Cao, Y., Hu, H., Wei, Y., Zhang, Z., Lin, S., and Guo, B. Swin transformer: Hierarchical vision transformer using shifted windows, 2021b. URL https://arxiv.org/abs/2103.14030.

Lu, J., Clark, C., Zellers, R., Mottaghi, R., and Kembhavi, A. Unified-io: A unified model for vision, language, and multi-modal tasks. arXiv preprint arXiv:2206.08916, 2022.

Luddecke, T. and Ecker, A. S. Image segmentation using text and image prompts, 2021. URL https://arxiv.org/abs/2112.10003.

Mokady, R., Hertz, A., and Bermano, A. H. Clipcap: Clip prefix for image captioning, 2021. URL https://arxiv.org/abs/2111.09734.

Radford, A., Kim, J. W., Hallacy, C., Ramesh, A., Goh, G., Agarwal, S., Sastry, G., Askell, A., Mishkin, P., Clark, J., Krueger, G., and Sutskever, I. Learning transferable visual models from natural language supervision, 2021. URL https://arxiv.org/abs/2103.00020.

Richter, S. R., Vineet, V., Roth, S., and Koltun, V. Playing for data: Ground truth from computer games. In Leibe, B., Matas, J., Sebe, N., and Welling, M. (eds.), European Conference on Computer Vision (ECCV), vol. 9906 of LNCS, pp. 102-118. Springer International Publishing, 2016.

Ros, G., Sellart, L., Materzynska, J., Vazquez, D., and Lopez, A. M. The synthia dataset: A large collection of synthetic images for semantic segmentation of urban scenes. In 2016 IEEE Conference on Computer Vision and Pattern Recognition (CVPR), pp. 3234-3243, 2016. doi: 10.1109/CVPR.2016.352.

Sun, C., Shrivastava, A., Singh, S., and Gupta, A. Revisiting unreasonable effectiveness of data in deep learning era. In Proceedings of the IEEE International Conference on Computer Vision (ICCV), Oct. 2017.

Vaswani, A., Shazeer, N., Parmar, N., Uszkoreit, J., Jones, L., Gomez, A. N., Kaiser, L., and Polosukhin, I. Attention is all you need, 2017. URL https://arxiv.org/abs/1706.03762.

Xu, J., De Mello, S., Liu, S., Byeon, W., Breuel, T., Kautz, J., & Wang, X. (2022). GroupViT: Semantic Segmentation Emerges from Text Supervision. In Proceedings of the IEEE/CVF Conference on Computer Vision and Pattern Recognition (pp. 18134-18144).

* cited by examiner

SYSTEM AND METHOD FOR TRANSFER SEMANTIC SEGMENTATION VIA LEARNABLE IMAGE PROMPTING OF FOUNDATION MODELS

TECHNICAL FIELD

The present disclosure relates neural network pipelines and improving performance, transferability, and generalizability of such pipelines, such as those that include foundation models.

BACKGROUND

Semantic segmentation remains a popular task within the computer vision and machine learning communities, due in large part to its importance for scene understanding in autonomous driving. The task presents numerous challenges, however, as the effort involved in labeling each pixel of each image—across a diverse set of weather conditions in various geographical regions—precludes large-scale dataset-creation and deployment of learning-based models in autonomous vehicles. Due to this labeling cost, it has become popular to generate datasets of synthetic images from 3D simulators to train models on these synthetic source domains for the prediction of semantic segmentation, then transfer those trained models to real-world contexts—to predict semantic segmentation on an unlabeled, photorealistic target dataset. In order to avoid transferring implicit knowledge that is erroneous in the target domain, various transfer learning approaches have been proposed. Conventionally, popular transfer methods involve some form of self-training, e.g., wherein pseudo-labels are generated from the most confident predictions of the source-model on target-domain observations. These methods fall prey to a form of confidence bias, however, as they are susceptible to disproportionate contribution from majority classes in the source training set. Moreover, standard transfer approaches exhibit high computational costs, since the pseudo-labeling procedure must be repeated in multiple stages, in order to obtain an optimum that yields a competitive inference model.

Foundation models may be models that have large capacities for data representation (e.g., through vast numbers of layer sizes and internal weight and bias parameters, as in Large Language Models or "LLMs" or Vision Language Models or "VLMs") that have been additionally pre-trained on multiple massive datasets. These datasets may consist of millions of paired-data samples—e.g., images with their captions—and the foundation models may be trained with one of several objectives. One objective might be to learn to score the alignment (similarity) between the inputs, e.g., an arbitrary image and an arbitrary text caption. Challenges arise, however, when the intended use of the foundation model ("downstream task") does not align perfectly with the foundation model's pretext tasks: in these situations, the representations produced by the foundation model may not be useful; in the worst case, they may actually cause the overall task-specific framework to perform worse on the downstream task and to generalize no better than if the foundation model were not included in the first place. The system and method described below discussed how to achieve the best of both worlds: to leverage the representational capacity and generalization capabilities of the foundation model, while maintaining or improving downstream task-specific performance.

SUMMARY

According to a first illustrative embodiment, a computer-implemented method includes receiving one or more fixed text prompts and one or more images, wherein the fixed text prompts are associated with the one or more images, in response to utilizing the fixed text prompt and the one or more images at a foundation model associated with a machine-learning network, outputting an intermediate representation from generating a series of objects and a task, decoding the intermediate representation utilizing a decoder associated with the foundation model to generate a matrix associated with the task associated with the fixed text prompt and the image, and in response to identifying a highest probability associated with the matrix utilizing label selection, outputting a final label associated with a visual based prediction task.

According to a second illustrative embodiment, a method includes receiving one or more fixed text prompts at a foundational model, receiving one or more images at a learnable image prompt network, wherein the fixed text prompts are associated with the one or more images, generating a fixed-dimensional continuous latent vector at the learnable image prompt network utilizing the one or more images, in response to utilizing the fixed text prompt and the fixed-dimensional continuous latent vector at a foundation model associated with a machine-learning network, outputting an intermediate representation from generating a series of objects and a task, decoding the intermediate representation utilizing a decoder associated with the foundation model to generate a matrix associated with the task associated with the fixed text prompt and the image, and in response to identifying a highest probability associated with the matrix utilizing label selection, outputting a final label associated with a visual based prediction task.

According to a third illustrative embodiment, a system includes a controller configured to receive one or more fixed text prompts and one or more images, wherein the fixed text prompts are associated with the one or more images. The controller is further configured to, in response to utilizing the fixed text prompt and the one or more images at a foundation model associated with a machine-learning network, output an intermediate representation from generating a series of objects and a task, decode the intermediate representation utilizing a decoder associated with the foundation model to generate a matrix associated with the task associated with the fixed text prompt and the image, and in response to identifying a highest probability associated with the matrix utilizing label selection, output a final label associated with a visual based prediction task.

DETAILED DESCRIPTION

Figure 1:
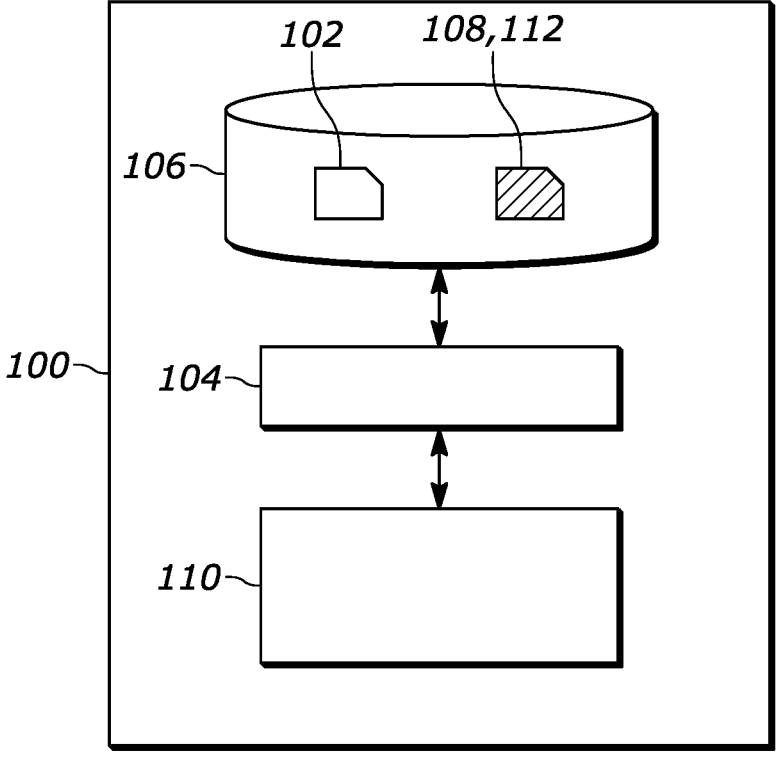
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In this disclosure, the system may leverage multimodal foundation models in a machine learning training and inference pipeline. Foundation models may be models that have large capacities for data representation (e.g., through vast numbers of layer sizes and internal weight and bias parameters, as in Large Language Models or "LLMs") that have been additionally pre-trained on multiple massive datasets. These datasets may consist of millions of paired-data samples—e.g., images with their captions—and the LLMs may be trained with one of several objectives. One objective might be to learn to score the alignment (similarity) between the inputs, e.g., an arbitrary image and an arbitrary text caption. Another objective might be to reconstruct an image, given a natural language text caption plus the corresponding image with random patches missing or deleted. Alongside these training objectives, some intermediate continuous-valued vector representations from the foundation model may be used to perform (pretext) tasks, such as image classification, image captioning, object segmentation, and semantic segmentation. An implicit assumption may be that the intended use of the foundation model, downstream, is to also perform one of the tasks in its set of pretext tasks. Through this extensive pre-training (using large datasets with challenging training objectives, on various pretext tasks), the LLM will have amassed enough experience in multiple domains to serve as a basis for task-specific architectures that are built atop the foundation model. In operation, after their pre-training, foundation models can be made non-trainable ("frozen") and simply used in an "inference mode" on a variety of downstream tasks. In this manner, the foundation model enables cross-domain generalization capabilities of the downstream task-specific framework, through its experience in modelling several tasks and domains. One point of novelty of this disclosure may include the training and development of additional modules that perform non-linear transformations on the output of the frozen foundation model. As such, the system may extract the best of both worlds: cross-domain generalization capability (preserved from the foundation model), together with competitive in-domain performance (from the task-specific backbone).

This disclosure provides a method and system for a learnable and reusable perception model, which can be attached to any greater system that needs to operate in a diverse set of real-world environments. Across different operating environments, there exist data domain distribution shifts (e.g., differences in the visual appearances of objects, differences in the physical dynamics of the greater system, differences in the sensor models that the greater system uses to sense the world, etc.), which pose challenges to any non-generalizable components of the greater system. Examples of greater systems that would benefit significantly from the generalizable perception module that this disclosure details, includes (but is not limited to) mobile robots, automated vehicles, and smart cameras. One novelty of our generalizable perception module stems from the fact that it leverages non-learnable ("frozen") multimodal foundation models in order to enhance the cross-domain performance of the greater system; however, using a foundation model directly is challenging, because it requires the strong assumption that the intended use ("downstream task") aligns perfectly with how the foundation model was originally trained ("pretext task(s)"). If there is not alignment between the pretext task(s) and the downstream task, the in-domain performance of the greater system will suffer dramatically. Therefore, the second source of novelty in our work is that the foundation model can be coupled with task-specific modules, in a way that maintains the cross-domain generalization capability (obtained from the multimodal foundation model), while also obtaining competitive in-domain performance on the downstream task of interest. The way this coupling could happen is by way of multiple components: (i) a learnable image prompt model, (ii) a task-specific encoder model, a (iii) a task-specific decoder model, and (iv) a learnable fusion model. These component models could be trainable neural networks or any other types of models that have learnable functional parameters. For the sake of illustration, this disclosure will describe the aforementioned components specifically in the context of the transfer semantic segmentation downstream perception task.

This invention provides a method and system for a learnable and reusable perception model, which can be attached to any greater system that needs to operate in a diverse set of real-world environments. Across different operating environments, there exist data domain distribution shifts (e.g., differences in the visual appearances of objects, differences in the physical dynamics of the greater system, differences in the sensor models that the greater system uses to sense the world, etc.), which pose challenges to any non-generalizable components of the greater system. Examples of greater systems that would benefit significantly from the generalizable perception module that this disclosure details, includes (but is not limited to) mobile robots, automated vehicles, and smart cameras. One novelty of our generalizable perception module stems from the fact that it leverages non-learnable ("frozen") multimodal foundation models in order to enhance the cross-domain performance of the greater system; however, using a foundation model directly is challenging, because it requires the strong assumption that the intended use ("downstream task") aligns perfectly with how the foundation model was originally trained ("pretext task(s)"). If there is not alignment between the pretext task(s) and the downstream task, the in-domain performance of the greater system will suffer dramatically. Therefore, the second source of novelty in our work is that the foundation model can be coupled with task-specific modules, in a way that maintains the cross-domain generalization capability (obtained from the multimodal foundation model), while also obtaining competitive in-domain performance on the downstream task of interest. The way this coupling could happen is by way of multiple components: (i) a learnable image prompt model, (ii) a task-specific encoder model, a (iii) a task-specific decoder model, and (iv) a learnable fusion model. These component models could be trainable neural networks or any other types of models that have learnable functional parameters. For the sake of illustration, this disclosure will describe the aforementioned components specifically in the context of the transfer semantic segmentation downstream perception task.

Reference is now made to the embodiments illustrated in the Figures, which can apply these teachings to a machine learning model or neural network. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the image-to-image machine-learning model and the mixer machine-learning model described herein. Additional structure for operating and training the machine-learning models is shown in FIG. 2.

Figure 2:
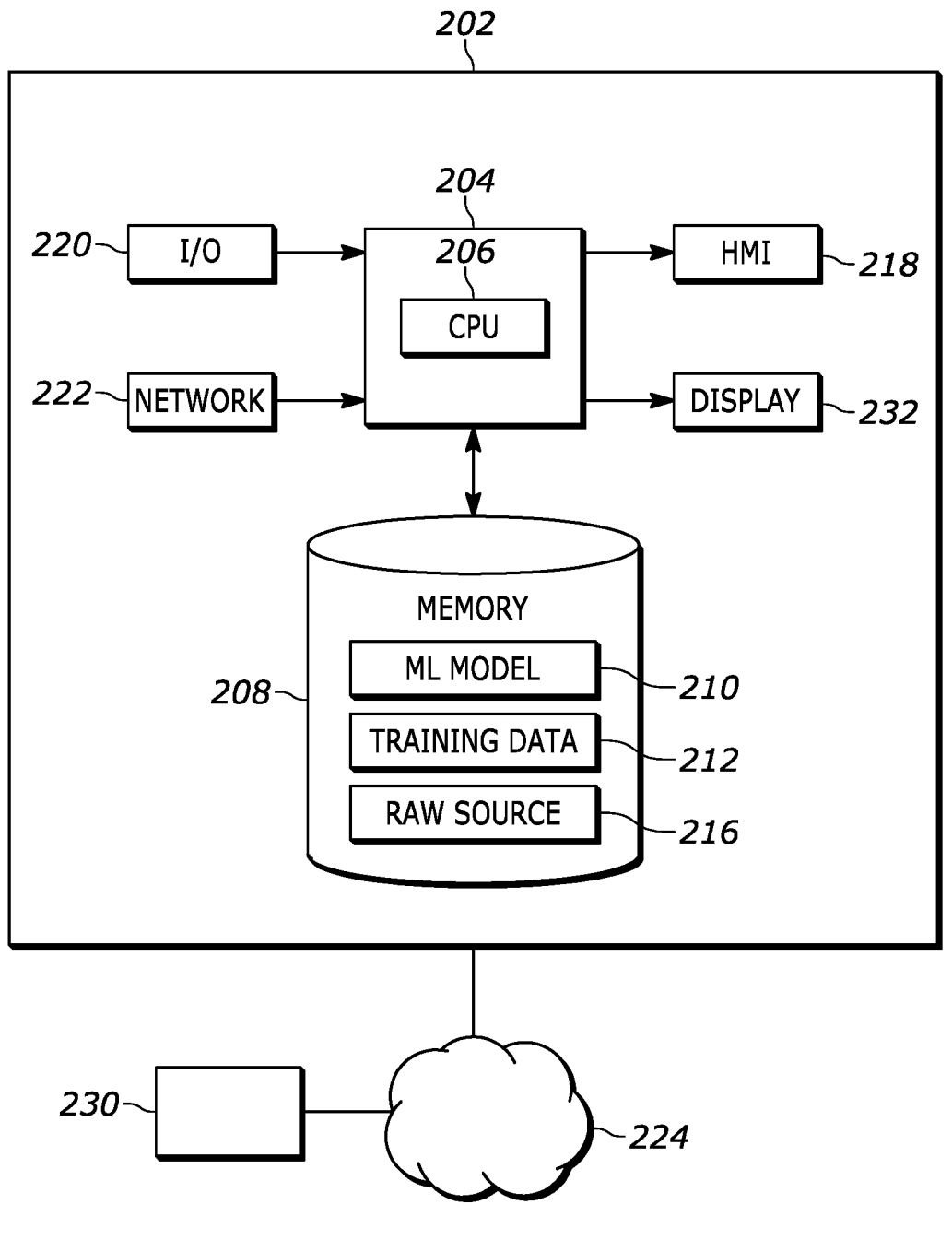
FIG. 2 shows a computer-implemented method for training and utilizing a neural network, according to an embodiment.

FIG. 2 depicts a system 200 to implement the machine-learning models described herein, for example the image-to-image machine-learning model, the mixer machine-learning model, and the pre-trained reference model described herein. The system 200 can be implemented to perform image quantization processes described herein. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuity or BUS networks to transfer information to or between the processor(s) and storage. For example, the I/O interface 220 can include digital I/O logic lines which can be read or set by the processor(s), handshake lines to supervise data transfer via the I/O lines; timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). Several different examples of inputs are shown and described with reference to FIGS. 5-11. In some examples, the machine-learning algorithm 210 may be a neural network algorithm (e.g., deep neural network) that is designed to perform a predetermined function. For example, the neural network algorithm may be configured in automotive applications to identify street signs or pedestrians in images. The machine-learning algorithm(s) 210 may include algorithms configured to operate the image-to-image machine-learning model, the mixer machine-learning model, and the pre-trained reference model described herein.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of a road sign in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., road sign). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

In an example, the raw source data 216 may include image data representing an image. Applying the machine-learning algorithms (e.g., image-to-image machine learning model, mixer machine-learning model, and pre-trained reference model) described herein, the output can be a quantized version of the input image.

Figure 3A:
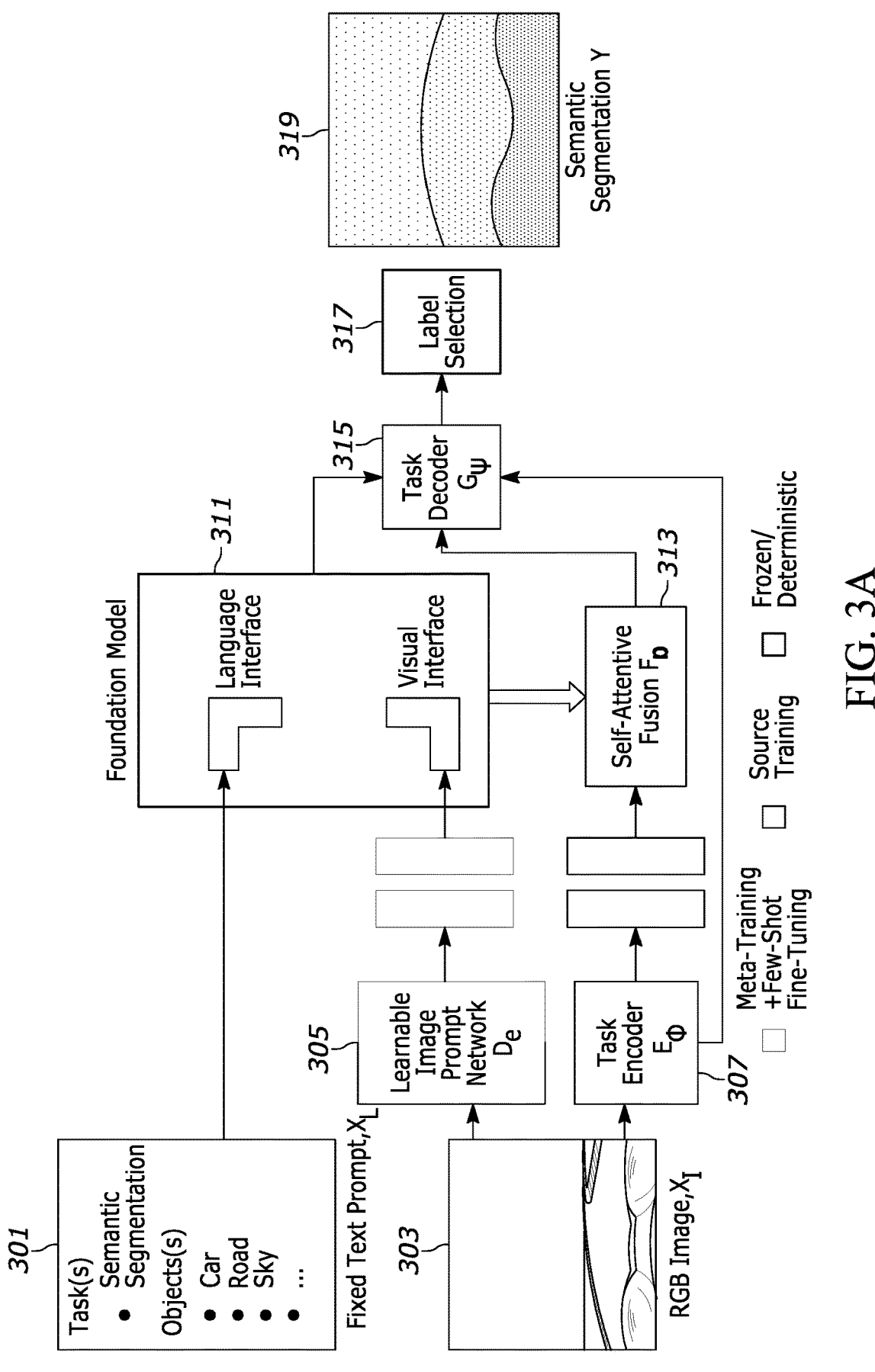
FIG. 3A illustrates an architecture of a system that is configured to perform transfer semantic segmentation via self-supervision and prompting of multimodal foundational models.

FIG. 3A illustrates an architecture of a system that is configured to perform transfer semantic segmentation via self-supervision and prompting of multimodal foundational models. The system may include a novel framework for harnessing foundation models—e.g., CLIP, UnifiedIO, GroupViT, etc.—for transfer learning, in the context of semantic segmentation for autonomous driving. Such a system may how competitive performance of this approach, compared to conventional unsupervised domain adaptation approaches, but with comparatively minimal computational cost. Due to the improved domain generalization brought about by such method, the system may show that source performance does not suffer, despite competitive target performance. Moreover, such embodiments may surpass state-of-the-art (SOTA) task performance, even when such a system may be configured for zero-shot inference. Such a system may propose a novel framework for learning continuous prompts in semantic segmentation, allowing our approach to avoid full fine-tuning of the foundation model while also circumventing the costly multi-stage self-training procedures in conventional domain adaptation approaches.

In one embodiment, such a framework consists includes a multimodal foundation model 311, a learnable image-based prompt mode 305, a task-specific encoder 307, a task-specific decoder 315, a learnable fusion module 313. An illustration of our approach is included in FIG. 3A, below. Alternative configurations of similar approaches are included in FIGS. 3B and 3C. The inputs X may include a fixed text prompt 301. The fixed text prompt 301 may include a task and associated objects. For example, the task may include "semantic segmentation" or another task related to image recognition. The objects may refer to associated objects in an image. The inputs X may also include an RGB image 303. Of course, any type of image may be utilized such as a sound image, picture, video, ultrasound, radar, etc. The image prompt network $D_\theta$ is a learnable mapping function—from the inputs X to some fixed-dimensional continuous latent vector space $Z_{prompt}$:

$D_\theta{:}X{\rightarrow}Z_{prompt}$

One job of the image prompt network 305 may be to produce a learned image prompt. To be an effective prompt input to the multimodal foundation model 311, the statistical distribution of $Z_{prompt}$ may have certain properties. Firstly, the statistical distribution of the latent vector space $Z_{prompt}$ must be organized such that its sub-domains (statistical modes) match with the sub-domains of (i) the source input X distribution, (ii) the relevant sub-domains that the foundation model supports from its pre-training objectives and pretext tasks, and (iii) the sub-domains of the source label Y distribution. The system may include further regularization of the distribution of $Z_{prompt}$, through the use of domain knowledge, to enable matching with the target input/label distributions. The manifestation and effectiveness of this domain knowledge (knowledge graphs, statistical priors, constraints, logical rules, expert demonstrations or labels, etc.) varies across downstream applications. In order to encourage these properties, the system may subject De to a meta-learning objective, with respect to a source dataset with known-meaningful sub-domains in its data distribution. Secondly, the $Z_{prompt}$ representation must have clearly-articulated statistical modes (high intra-mode density and low inter-mode density), which enables effective inference. To pursue these properties, the system may subject De to a contrastive learning objective, with respect to an initial statistical distribution of the $Z_{prompt}$ representation (e.g., that which follows from the above meta-learning stage) and a similarity function (e.g., a cosine distance metric function). Specific formulations of the contrastive objective that will prove effective can vary across domains and are contingent on the types of inputs. In the context of image-based prompt-learning, in the transfer semantic segmentation task, the system might enforce that prompts from "similar"-looking images (e.g., similar in road layouts, object arrangements), despite belonging to different sub-domains (e.g., bright summer weather, versus dark winter conditions) should be close to each other in a projected representation space.

The task-specific encoder $E_\phi$307 may be a learnable functional map—from the inputs X to some fixed-dimensional, continuous latent vector space $Z_{enc}$:

$E_\phi{:}X{\rightarrow}Z_{enc}$

One of its job may be to produce a latent vector that serves as a concise and dense summary of the input(s), which could be of one or multiple modalities (e.g., RGB images, natural language text, audio signals, etc.). $E_\phi$ may be implemented as a function approximator, such as a neural network, with learnable parameters $\phi$.

The foundation model may provide a natural interface for a predetermined, fixed prompt input, e.g., in natural language text. This fixed text prompt allows for initial specialization of the foundation model on a particular task (e.g., semantic segmentation) and domain (e.g., a particular sets of objects, particular environmental setting). Because of the advantages of this initial specialization, using an appropriate supported fixed text prompt is of paramount importance for using the foundation model in a downstream task. The fixed text prompts that are supported by the foundation model are directly associated with the pretext tasks that the foundation model was originally trained to perform; one may use the appropriate fixed text prompt to perform the corresponding task. Challenges arise, however, when there is a mismatch between the pretext task(s) and the downstream task for which the foundation model is leveraged. In these conditions, "custom" fixed text prompts must be formulated (or "engineered") for the task at hand. Indeed, for situations where the foundation model does not support the downstream task (e.g., semantic segmentation), the system may construct multiple fixed text prompts $$T^{o,task}_{prompt}$$

that includes sufficient object references and task specifications for enabling the foundation model to generate a series of outputs that can be subsequently combined:

$$\{\text{FOUND}(T^{o,task}_{prompt}), \text{FOUND}(T^{o,task}_{prompt}), \ldots, \text{FOUND}(T^{o,task}_{prompt})\} \forall \; o \in O,$$

$$\text{s.t. task} \in \text{tasks,}$$

where O is the set of objects that can be detected by the foundation model and task is a single task that is supported by the foundation model. In the case of using the UnifiedIO foundation model (Lu et al., 2022), for example, O is the set of object classes to be detected in the downstream semantic segmentation task (e.g., road, sidewalk, person, rider, car, truck, bus, motorcycle, bicycle, caravan, trailer, building, wall, fence, guard rail, bridge, tunnel, pole, traffic sign, traffic light, vegetation, terrain, sky, ground) and task is the selected pretext task supported by the foundation model (e.g., object/instance segmentation).

In one embodiment, the system may inject learned prompt representations into various models or modules of the system. For example, using the fixed text prompt, alone, is often insufficient for competitive performance on a downstream task. Therefore, the system may consider additionally using the learned prompt where O is the set of objects that can be detected by the foundation model and task is a single task that is supported by the foundation model. In the case of using the UnifiedIO foundation model for example, O is the set of object classes to be detected in the downstream semantic segmentation task (e.g., road, sidewalk, person, rider, car, truck, bus, motorcycle, bicycle, caravan, trailer, building, wall, fence, guard rail, bridge, tunnel, pole, traffic sign, traffic light, vegetation, terrain, sky, ground) and task is the selected pretext task supported by the foundation model (e.g., object/instance segmentation).

Using the fixed text prompt, alone, may be often insufficient for competitive performance on a downstream task. Therefore, the system may consider additionally using the learned prompt representations $Z_{prompt}$. After having enforced $Z_{prompt}$ to be an effective sub-domain map (first set of desired properties) and to have clear articulation in its distribution (second set of desired properties), discussed in the "Learnable Image Prompt Model" sub-section above, the system may choose where and how to effectively inject this learned prompt into an input interface of the multimodal foundation model. As $Z_{prompt}$ is not an image, but rather a representation (a continuous-valued vector that represents latent variable, which serves as a concise summary) of an image, the system may choose to feed $Z_{prompt}$ to an intermediate layer of the foundation model's image encoder, as opposed to using it as a direct image input. This may be done to make training, alongside the frozen foundation model, more stable and sample-efficient.

Given the fixed text prompt $T_{prompt}$ and a learned image-based prompt representation $Z_{prompt}$, the foundation model produces a multimodal foundation model representation $\text{FOUND}_{repr}$:

FOUND: $Z_{prompt} \times T_{prompt} \rightarrow \text{FOUND}_{repr}$

Depending on the application, $\text{FOUND}_{repr}$ can be an intermediate representation from the foundation model's encoder, the foundation model's decoder, a representation from one of the foundation model's output prediction heads, a combination of multiple foundation model prediction heads (if available), or some combination of the aforementioned.

FIG. 3A illustrates an architecture of a system that is configured to perform transfer semantic segmentation via self-supervision and prompting of multimodal foundational models. A fixed text prompt 301 may be fed into a foundational model 303. The foundational module may be frozen. The input may also include an RGB image 303. The RGB image 303 may be fed into a learnable image prompt network 305. As previously mentioned, the image prompt network may be a learnable mapping function—from the inputs to some fixed-dimensional latent vector space. The input RGB image 303 may also be fed to a task encoder 307.

The task encoder 307 may output information to be sent to the fusion model 313. One goal of the fusion mechanism 313 $F_\alpha$ may be to combine the more general representations from the foundation model 311 with the task-specific representations $Z_{enc}$ from the task specific encoder module $E_\phi$. Such combination yields a framework that exhibits the best of both worlds—task-awareness (with strong in-domain performance) and strong cross-domain generalization. $F_\alpha$ takes as input the task-specific encoder representation $Z_{enc}$ and the prompted multimodal foundation model representation $\text{FOUND}_{repr}$.

$F_\alpha$: $[Z_{enc}; \text{FOUND}_{repr}] \rightarrow Z_{att}$, where the operator ";" indicates vector concatenation. Without loss of generality, the system and method include other suitable forms of vector combination or regression strategies, such as the weighted Hadamard product, inner product, outer (cross) product, cross-modal attention, pairwise cross-modal attention, self-attention, distributional alignment constraints, L-norm constraints, etc. $F_\alpha$ outputs the fused multimodal context $Z_{att}$, as input to a task-specific decoder module (next sub-section). $F_\alpha$ may be implemented as a function approximator, such as a neural network, with learnable parameters a.

The task-specific decoder $G_\psi$ may a learnable functional map that takes as input a vector from the intermediate latent representation space $Z_{enc}$ (produced by task encoder 307 $E_\phi$), the (self-)attended fusion context $F_\alpha$ 313, and the prompted multimodal foundation model representation $\text{FOUND}_{repr}$ from the foundation model 311. Depending on the application, $\text{FOUND}_{repr}$ can be an intermediate representation from the foundation model's encoder, the foundation model's decoder, a representation from one of the foundation model's output prediction heads, a combination of multiple foundation model prediction heads (if available), or some combination of the aforementioned. $G_\psi$ maps these inputs to an output label representation space $Z_{P,\{s,t\}}$; this output space can be interpreted as giving the unnormalized probability distributions over the $\{C^s, C^t\}$ classes (see problem definition, above). If the task label space Y is of more than two dimensions (as in the semantic segmentation task), $Z_{P,\{s,t\}}$ respectively specifies an element-wise collection of probability distributions over the classes $\{C^s, C^t\}$:

$G_\psi$: $[Z_{enc}; F_\alpha; \text{FOUND}_{repr}] \odot \text{mask} \rightarrow Z_{P,\{s,t\}}$, where the operator ";" indicates vector concatenation and "⊙" indicates the Hadamard product (elementwise vector multiplication, at the corresponding dimension). Without loss of generality, the system include other suitable forms of vector combination or regression strategies, beyond vector concatenation, such as the weighted Hadamard product, inner product, outer (cross) product, cross-modal attention, pairwise cross-modal attention, self-attention, distributional alignment constraints, L-norm constraints, etc. In some applications, the decoder may need an addition bias in order to make use of foundation model's representation $FOUND_{repr}$, while it is being trained; for such situations, the system may include a multiplicative vector mask on the input to decoder 315 $G_\psi$. The mask may itself be a learnable filter or simply a static representation. The overall job of the decoder 315 $G_\psi$, may be to produce a latent vector from which the correct label for the downstream task can be sampled with high probability or otherwise generated or selected. $G_\psi$, may be implemented as a function approximator, such as a neural network, with learnable parameters $\psi$.

Figure 3B:
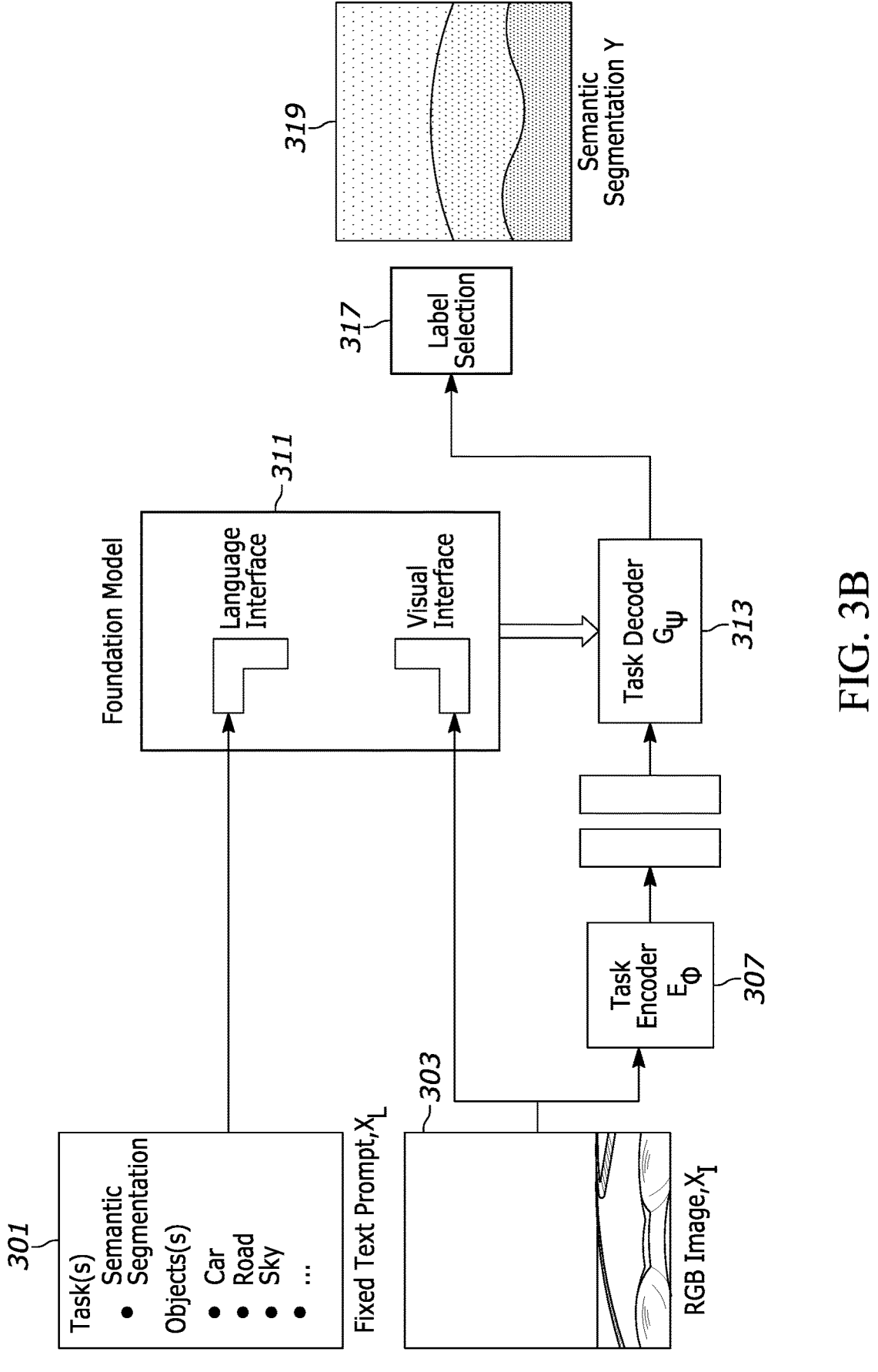
FIG. 3B illustrates an architecture of a system that is configured to perform transfer semantic segmentation via self-supervision from multimodal foundational models.
Figure 3C:
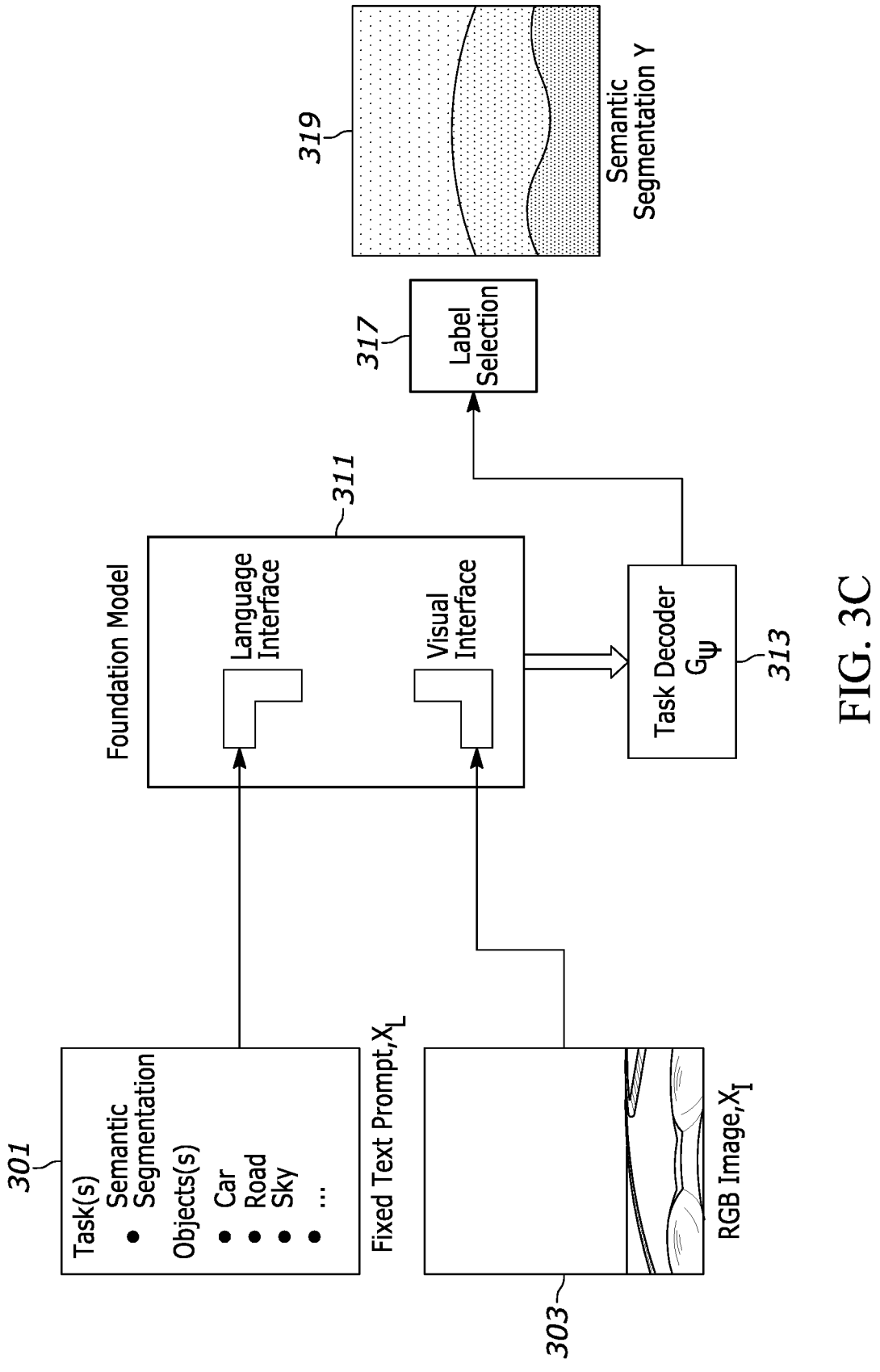
FIG. 3C illustrates an architecture of a system that is configured to perform transfer semantic segmentation via self-supervision from multimodal foundational models.

FIG. 3B illustrates an architecture of a system that is configured to perform transfer semantic segmentation via self-supervision from multimodal foundational models. In such an embodiment, the system may be missing a learnable image prompt network 305. Thus the RGB image 301 may be sent straight to the foundation model 311. The task encoder 307 may received the input image 303, which may be an RGB image in one non-limiting example. The task encoder 307 may encode the image to be sent to a task decoder 313 for decoding of the representation. Additionally the foundation model 311 representation may be sent to the decoder 313 for decoding. The decoder 315 may produce a latent vector from which the correct label for the downstream task can be sampled with high probability or otherwise generated or selected. The label selection 317 processor module may utilize the latent vector to FIG. 3C illustrates an architecture of a system that is configured to perform transfer semantic segmentation via self-supervision from multimodal foundational models. In such an embodiment, the system may be missing a learnable image prompt network 305 and task encoder as compared to the embodiments disclosed in FIGS. 3B and 3C. Thus, both the fixed text prompt 301 and the RGB image 301 may be sent straight to the foundation model 311. The fixed text prompt may include both a task (e.g. "semantic segmentation") and object (e.g., car, road, sky, etc.). The task decoder 313 may work with the foundational model 311 to provide an appropriate output 319, which may include an image with semantic segmentation 319 in one example.

Figure 4:
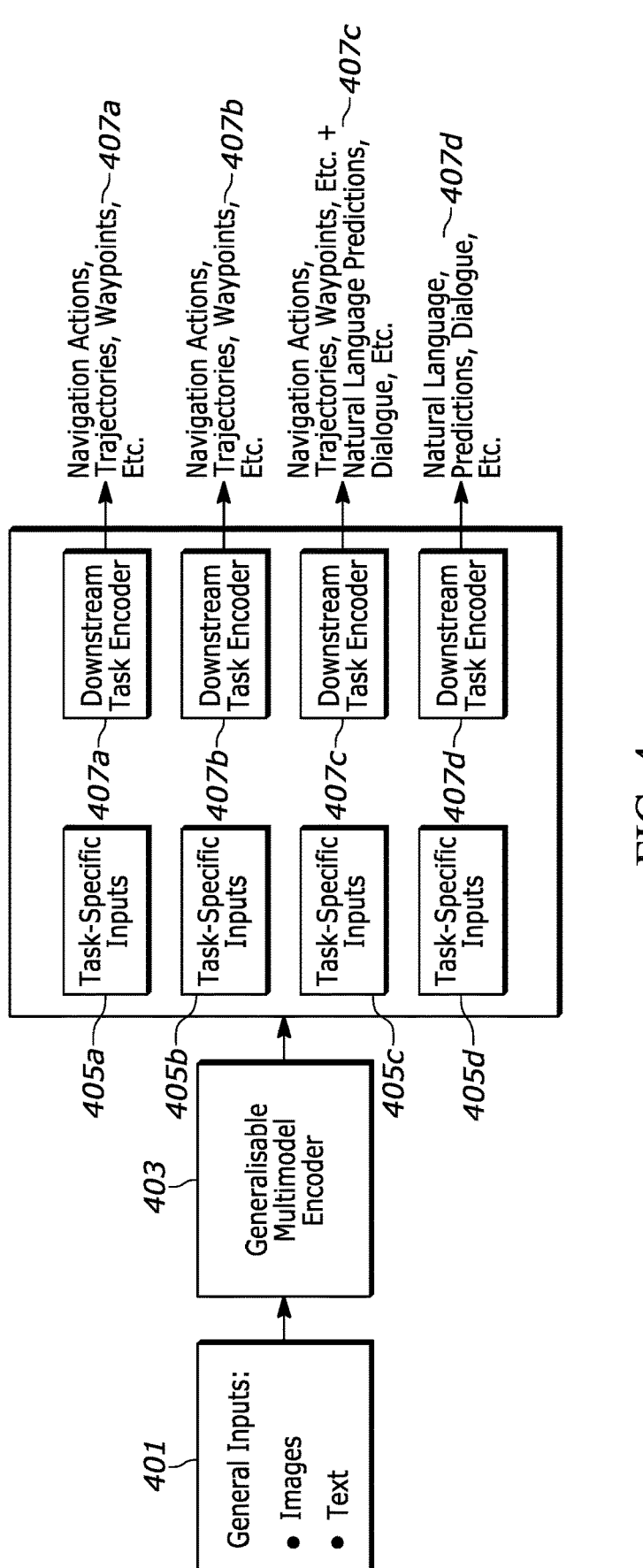
FIG. 4 illustrates a system overview for an application landscape according to one embodiment.

FIG. 4 illustrates a system overview for an application landscape according to one embodiment. In such an embodiment, the system may include a general input 401. The input 401 may include images, texts, etc. The input 401 may be fed into a multimodal encoder system 403. The multimodal encoder system may be one of the systems disclosed in FIGS. 3A thru 3C, but not limited to such a system. In one embodiment, the system may utilize such task-specific inputs 405a, 405b, 405c, 405d, for a variety of applications, as discussed further below. The system may utilize the downstream task encoders 407a, 407b, 407c, 407d, for a variety of applications to create an output 407a, 407b, 407c, 407d. For example, in an autonomous driving policy, the system may output navigation actions, trajectories, waypoints, etc. based on an input as related to autonomous driving. In another example, for a robot navigation policy, the system may receive task-specific inputs related to the robot and output navigation actions, trajectories, waypoints, etc. In another example my include for an embodied question-answering system, the system may include task-specific inputs that output navigation actions, trajectories, waypoints in addition to natural language predictions, dialogue, etc. In yet another example, the system may support a visual question-answering decision-support system with natural language prediction, dialogue, etc.

Figure 5:
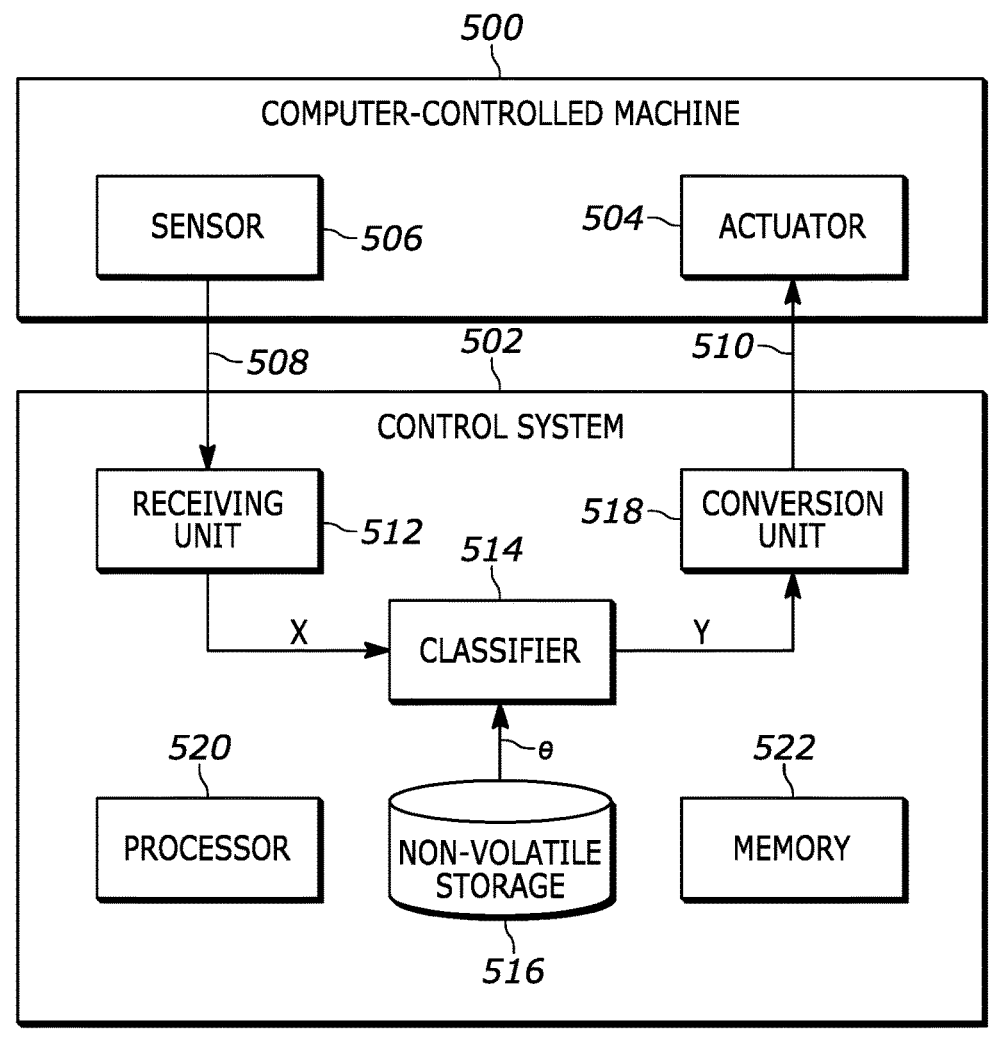
FIG. 5 depicts a schematic diagram of an interaction between a computer-controlled machine and a control system, according to an embodiment.

The machine-learning models described herein can be used in many different applications, and not just in the context of road sign image processing. Additional applications where visual based prediction task may be used are shown in FIGS. 6-11. Structure used for training and using the machine-learning models (or foundation models) for these applications (and other applications) are exemplified in FIG. 5. FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine-learning algorithms, such as those described above with regard to pre-trained classifier 306) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
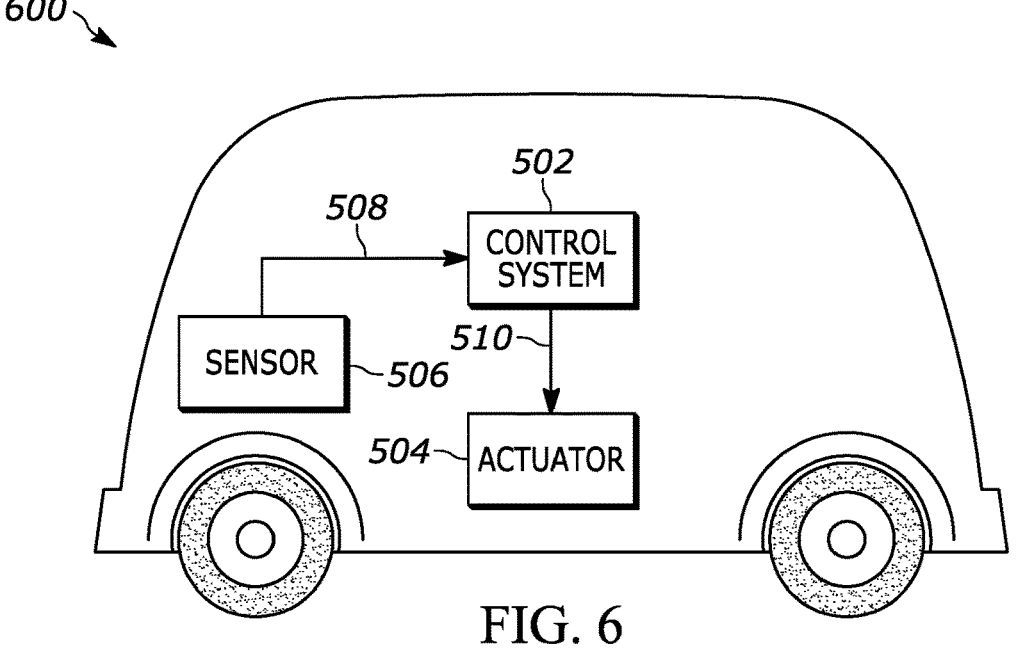
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes an autonomous driving policy that may provide navigation actions, trajectories, waypoints, or other items associated with vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
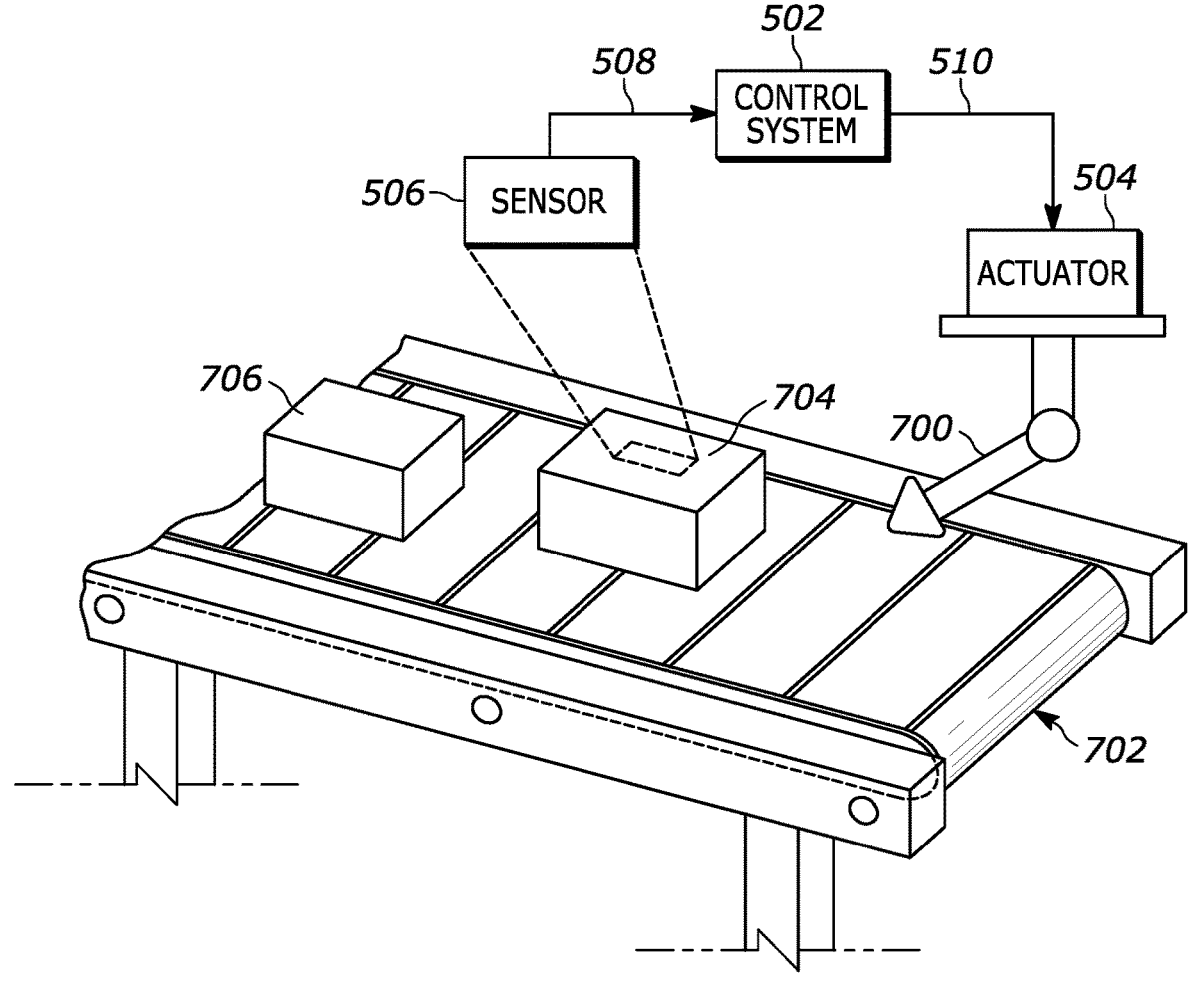
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 106 of system 700 (e.g., manufacturing machine) depending on the determined state of manufactured product 704.

Figure 8:
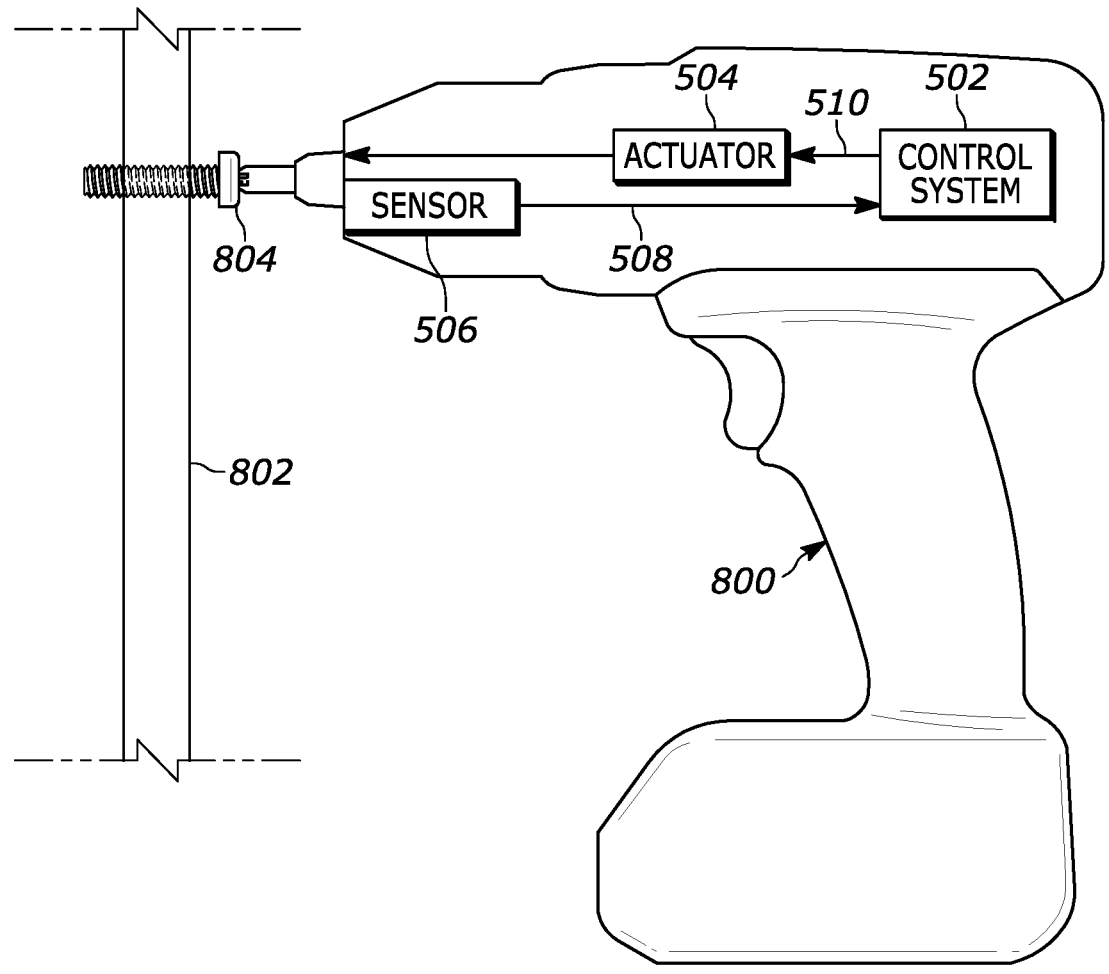
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
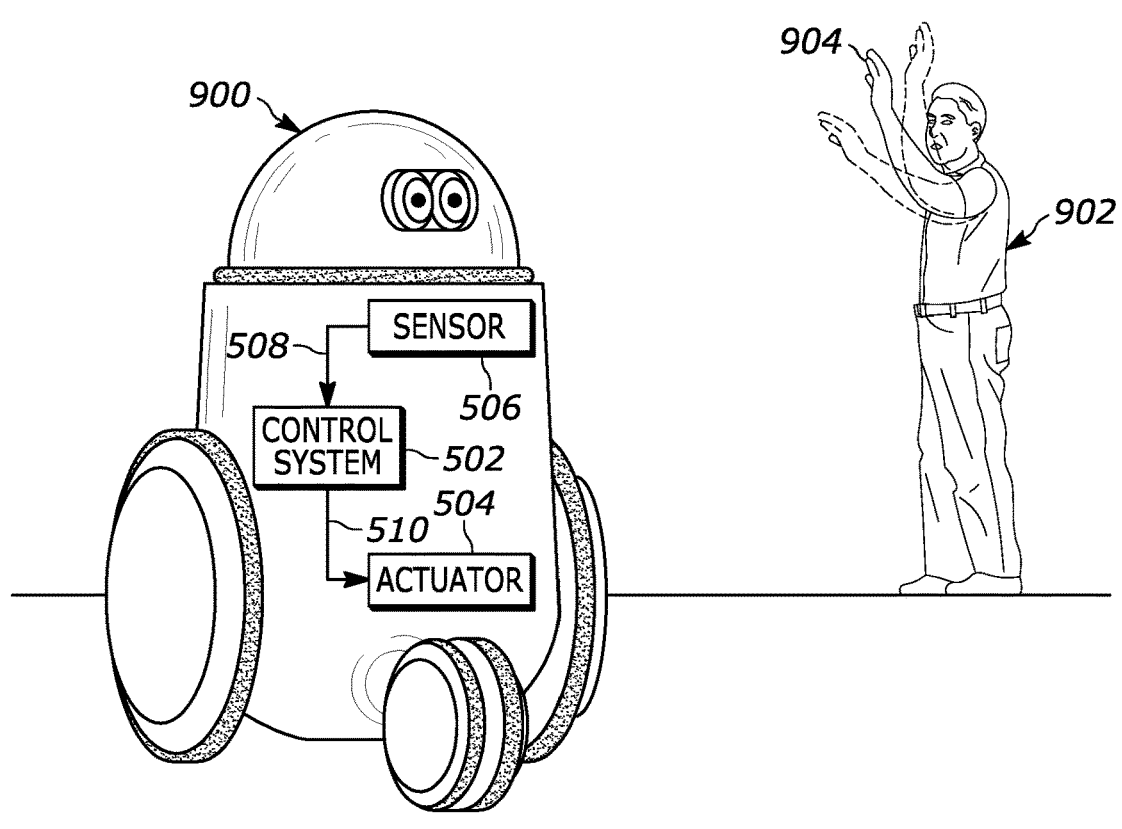
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
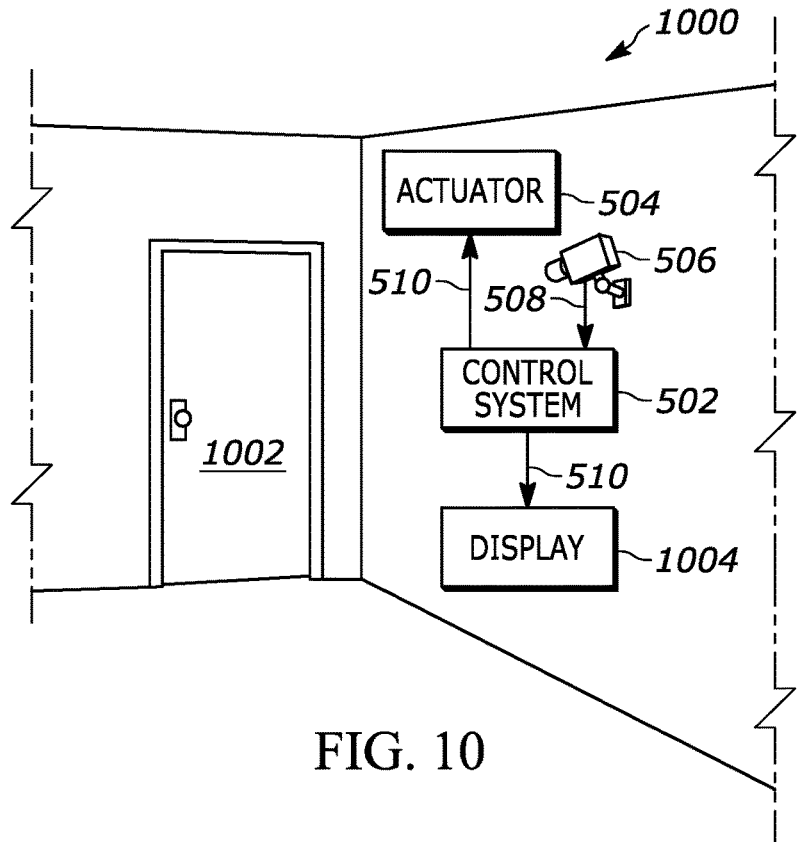
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may utilize semantic segmentation to highlight certain objects or suspicious activities.

Figure 11:
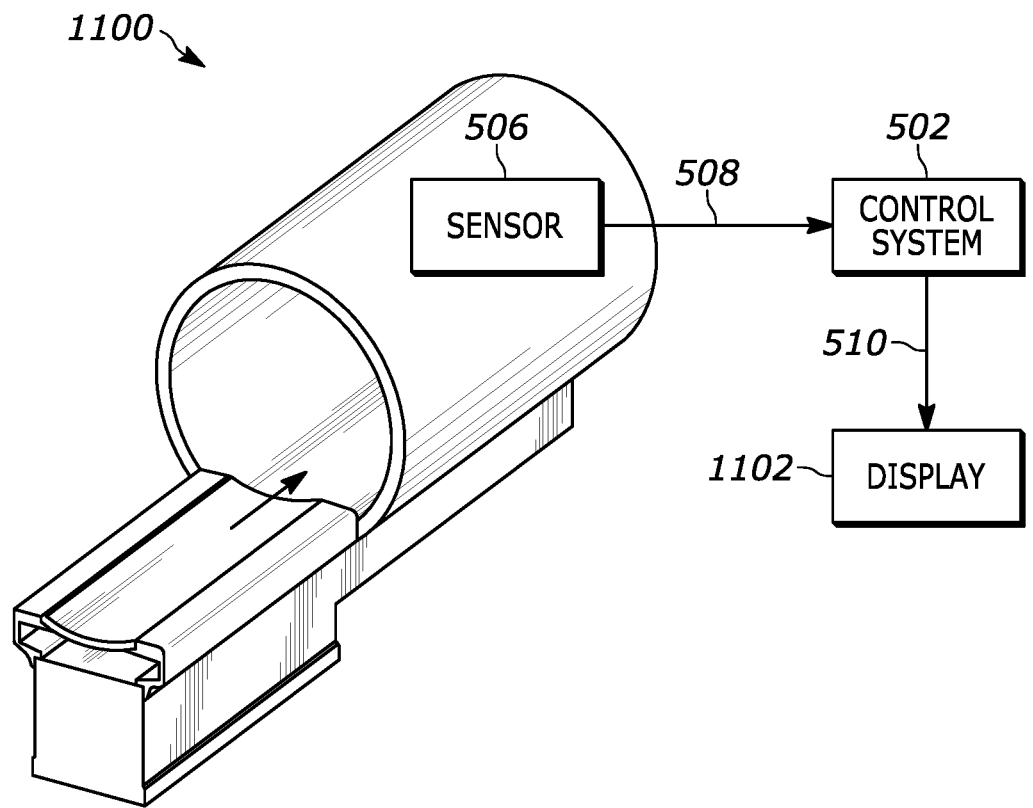
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method, comprising:
   receiving one or more fixed text prompts and one or more images, wherein the fixed text prompts are associated with the one or more images;
   in response to utilizing the fixed text prompt and the one or more images at a foundation model associated with a machine-learning network, outputting an intermediate representation from generating a series of objects and a task, wherein the foundational model includes an encoder, a decoder, and a prediction head;
   decoding, utilizing the decoder of the foundation model, the intermediate representation utilizing the decoder to generate a matrix associated with the task associated with the fixed text prompt and the image; and in response to identifying a highest probability associated with the matrix utilizing label selection, outputting a final label associated with a visual based prediction task.

2. The computer-implemented method of claim 1, wherein the foundational model is a multimodal model.

3. The computer-implemented method of claim 1, wherein the method includes utilizing, at an image prompt network, the one or more images to generate a fixed-dimensional continuous latent vector.

4. The computer-implemented method of claim 1, wherein the decoder is utilizing a task-specific decoder.

5. The computer-implemented method of claim 4, wherein the method includes utilizing a task-specific encoder.

6. The computer-implemented method of claim 1, wherein the decoder is a task-specific decoder that includes a learnable functional map that utilizes an input as a vector from an intermediation latent representation space from an encoder.

7. The computer-implemented method of claim 1, wherein the visual based prediction task is not including in pretraining of the foundation model.

8. The computer-implemented method of claim 1, wherein the visual based prediction task is semantic segmentation and the final label includes a semantic segmentation image.

9. A method, comprising:
   receiving one or more fixed text prompts at a foundational model, wherein the foundational model includes an encoder, a decoder, and a prediction head;
   receiving one or more images at a learnable image prompt network, wherein the fixed text prompts are associated with the one or more images;
   generating a fixed-dimensional continuous latent vector at the learnable image prompt network utilizing the one or more images;
   in response to utilizing the fixed text prompt and the fixed-dimensional continuous latent vector at the foundation model associated with a machine-learning network, outputting an intermediate representation from generating a series of objects and a task;
   decoding the intermediate representation utilizing a decoder associated with the foundation model to generate a matrix associated with the task associated with the fixed text prompt and the image; and
   in response to identifying a highest probability associated with the matrix utilizing label selection, outputting a final label associated with a visual based prediction task.

10. The method of claim 9, wherein the method further includes combining, utilizing a fusion model, representations from the foundation model with a task-specific representations from an encoder.

11. The method of claim 9, wherein the visual based prediction task is semantic segmentation and the final label includes a semantic segmentation image.

12. The method of claim 9, wherein the visual based prediction task is not including in pretraining of the foundation model.

13. The method of claim 9, wherein the task is a single task.

14. The system of claim 9, wherein the foundation model is configured to output an intermediate representation from one of a foundation model encoder, a foundation model decoder, a representation from an output of the head prediction head of the found model, or a combination of multiple foundation model prediction heads.

15. A system, comprising:

a controller configured to:

receive one or more fixed text prompts and one or more images, wherein the fixed text prompts are associated with the one or more images;

in response to utilizing the fixed text prompt and the one or more images at a foundation model associated with a machine-learning network, output an intermediate representation from generating a series of objects and a task, wherein the foundational model includes an encoder a decoder, and a prediction head;

decode the intermediate representation utilizing the decoder of the foundation model to generate a matrix associated with the task associated with the fixed text prompt and the image; and in response to identifying a highest probability associated with the matrix utilizing label selection, output a final label associated with a visual based prediction task.

16. The system of claim 15, wherein the visual based prediction task is semantic segmentation and the final label includes a semantic segmentation image.

17. The system of claim 15, wherein the visual based prediction task is not including in pretraining of the foundation model.

18. The system of claim 15, wherein the foundation model includes a language interface and visual interface.

19. The system of claim 15, wherein the system includes a task encoder configured to send one or more visual representations to the task decoder.

20. The system of claim 15, wherein the one or more images include a red green blue (RGB) image, sound image, video image, or radar image.

* * * * *